United States Patent [19]

Kütemeier

[11] 4,398,776
[45] Aug. 16, 1983

[54] ROLLER BEARING WITH ANNULAR RETAINING DISKS

[75] Inventor: Hans-Dieter Kütemeier, Sennfeld, Fed. Rep. of Germany

[73] Assignee: FAG Kugelfischer Georg Schäfer & Co., Schweinfurt, Fed. Rep. of Germany

[21] Appl. No.: 322,542

[22] Filed: Nov. 18, 1981

[30] Foreign Application Priority Data

Nov. 24, 1980 [DE] Fed. Rep. of Germany ....... 3044180

[51] Int. Cl.³ .............................................. F16C 19/28
[52] U.S. Cl. ................................ 308/207 R; 308/213; 308/DIG. 11
[58] Field of Search ........... 308/207 R, 213, DIG. 11, 308/198, 195, 207 A, 208

[56] References Cited

U.S. PATENT DOCUMENTS

| | | | |
|---|---|---|---|
| 3,302,987 | 2/1967 | Hoffmann et al. | 308/213 |
| 4,235,489 | 11/1980 | Schickling et al. | 308/207 R |
| 4,244,630 | 1/1981 | Tischer | 308/207 R |
| 4,270,815 | 6/1981 | Olschewski et al. | 308/213 |

Primary Examiner—Lenard A. Footland
Attorney, Agent, or Firm—Karl F. Ross

[57] ABSTRACT

A journal bearing with several rows of rollers, separated by one or more spacing rings, has an inner and an outer race defining between them an annular clearance which is laterally bounded by a first pair of annular disks fixedly secured to the inner race and a second pair of annular disks removably fastened to the outer race by a bayonet coupling. A spring-loaded bolt inserted in a bore on each end face of the outer race, between bayonet lugs thereof, snaps into a depression of the corresponding boundary disk when the latter has been rotated into its engaged position. A partly uncovered end of the bolt allows its repression by a suitable tool to release that disk for the purpose of disassembly.

6 Claims, 3 Drawing Figures

ROLLER BEARING WITH ANNULAR RETAINING DISKS

FIELD OF THE INVENTION

My present invention relates to a journal bearing in which a multiplicity of rotary bodies, especially cylindrical rollers, are disposed in one or more rows within an annular clearance defined by a cylindrical outer peripheral surface of an inner member and a cylindrical peripheral inner surface of an outer member coaxially surrounding the former.

BACKGROUND OF THE INVENTION

In order to retain the rollers or other rotary bodies in the clearance between the two bearing races, the ends of that clearance may be obstructed by annular disks secured to either or both of the coaxial members. For safe operation it is desirable that these obstructions should cover well over half the radial width of the clearance, yet a single disk rigid with either the inner or the outer member would generate considerable frictional heat by its contact with the adjoining rotary bodies, particularly in the case of a high-speed roller bearing. The art therefore prefers to use two pairs of disks each projecting by less than half the clearance width beyond the corresponding peripheral surface. If both pairs of disks are bolted or otherwise fixedly secured to their respective bearing member, a disassembly for replacement of parts, regrinding of surfaces or any other purpose would be difficult. The practice, therefore, has been to make one pair of disks—usually the outer pair—detachable from the associated member.

In commonly owned German published specification No. 2,503,916 there is disclosed a boundary disk of this type in the form of a flat ring held in position on an end face of an outer bearing member by a bayonet coupling consisting of peripherally spaced-apart retaining lugs on the bearing member and similarly spaced coacting lugs on the disk. In order to retain that disk in the locking position of the bayonet coupling, the end face and the confronting lug surfaces may be made slightly convergent to produce a wedging effect. From commonly owned German published specification No. 2,830,818 it is further known to provide a boundary disk in the form of a split flat ring which fits into a pheripheral groove on an end face of an outer bearing member and is retained in that groove by a spreader inserted between the ring segments separated by the split.

OBJECT OF THE INVENTION

The object of my present invention is to provide a journal bearing, of the general type described in the first-mentioned German publication, with one or two detachable boundary disks which are securely locked in position but can be conveniently released from that position for the purpose of disassembly.

SUMMARY OF THE INVENTION

In accordance with my present improvement, the bearing member carrying the detachable disk or disks is provided on one or both of its end faces with an axially extending bore accommodating a spring-loaded detent between two of its retaining lugs, the detent lying in confronting relationship with a marginal zone of the corresponding disk which is formed with a depression receiving that detent in the locking position.

Advantageously, pursuant to a more particular feature of my invention, the marginal disk zone overlies only part of a confronting end of the detent to facilitate its manual depression against the associated spring force when it is desired to release the disk from its locking position.

BRIEF DESCRIPTION OF THE DRAWING

The above and other features of my invention will now be described in detail with reference to the accompanying drawing in which.

SPECIFIC DESCRIPTION

Figure 1:
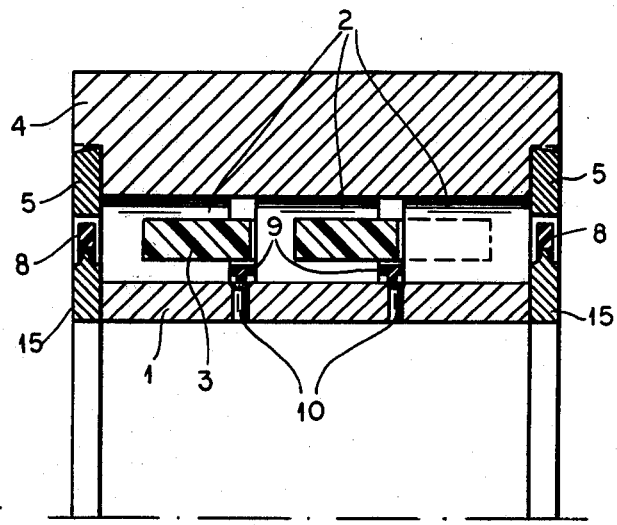
FIG. 1 is an axial sectional view of an upper half of a roller bearing embodying my invention.
Figure 2:
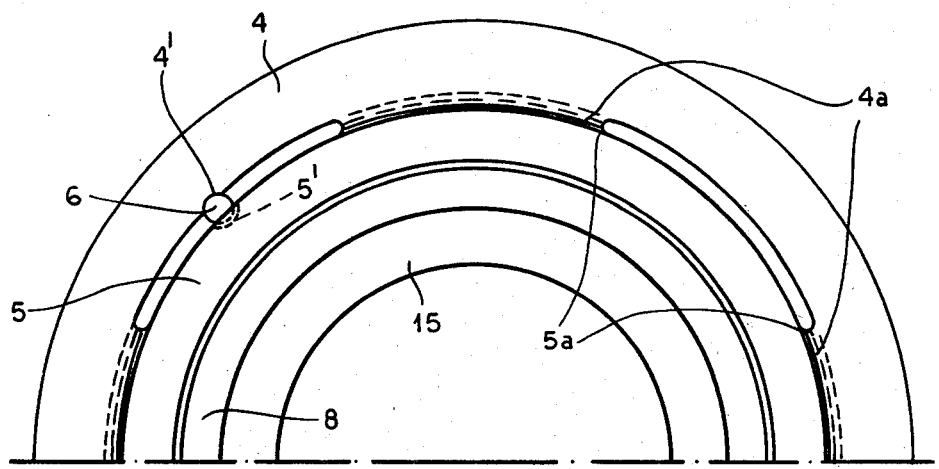
FIG. 2 is an end view of the bearing half shown in FIG. 1.

In FIGS. 1 and 2 I have shown a roller bearing with a cylindrical inner member or race 1 spacedly surrounded by a cylindrical outer member or race 4, the intervening annular clearance being occupied by three axially juxtaposed sets of rollers 2 engaged by respective annular cages 3 of resilient plastic material. The two laterally disposed sets of rollers are held in position by an inner pair of annular disks 15, fixedly secured to race 1, and an outer pair of annular disks 5 detachably mounted on race 4. Disks 15 are further provided with resilient strips 8 of rubber or the like which closely approach the disks 5 to act as dust shields. Race 1 also carries two spacer rings 9 fixedly rising from its peripheral surface to separate the three rows of rollers 2 from one another, these rings being undercut to communicate with radial bores 10 for the admission of lubricating oil from a supply conduit in a nonillustrated shaft onto which the race 1 can be fitted.

Figure 3:
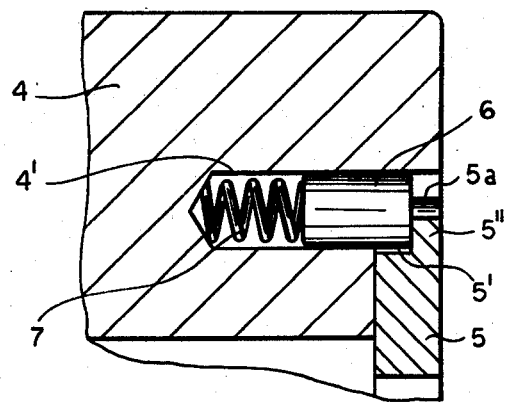
FIG. 3 is a fragmentary sectional view of the assembly of FIGS. 1 and 2, drawn to a larger scale.

The end faces of outer race 4 are recessed, as will be apparent from FIG. 1, and are each provided with a plurality of peripherally spaced bayonet lugs 4a illustrated in FIG. 2; the corresponding disk 5 has similar lugs 5a coacting with lugs 4a to retain the disk in a locking position in which these lugs are mutually aligned. An axially extending bore 4' at each end face of race 4, best shown in FIG. 3, accommodates a detent 6 in the form of a cylindrical pin which is under outward pressure from a coil spring 7; this bore lies substantially midway between two lugs 4a and, in the locking position of FIGS. 2 and 3, is aligned with a part-circular notch 5' of the corresponding disk 5 into which the pin 6 closely fits. Notch 5' is externally bounded by an annular ridge 5" which extends along the disk periphery and leaves uncovered a major part of the end of pin 6 whereby the latter can be repressed, e.g. by a screwdriver, against the force of spring 7 to release the disk 5 from its locking position. When the disk is fitted onto race 4 and rotated into that locking position, pin 6 snaps with an audible click into the part-circular depression or notch 5' to prevent any untimely release.

My present improvement, therefore, enables a ready demounting of either disk 5 when the bearing shown in the drawing is to be disassembled. Removal of one or the other disk allows the outer race 4 to be axially slid off the rollers 2 which therefore become accessible and thereby can be extracted from their cages. If only one or two sets of rollers are to be inspected or replaced, race 4 need not be completely separated from the remainder of the bearing.

I claim:

1. In a journal bearing wherein an inner member with a cylindrical outer peripheral surface is coaxially surrounded by an outer member with a cylindrical inner peripheral surface, said peripheral surface being separated by an annular clearance occupied by a multiplicity of rotary bodies holding said members apart while enabling relative rotation thereof about their common axis, said clearance being bounded on at least one end partly by a first annular disk rigid with one of said members and partly by a second annular disk coplanar with said first disk, the other of said members having at least one end face with peripherally spaced retaining lugs forming a bayonet coupling with coacting lugs of said second disk for holding same in a locking position on said other of said members, the improvement wherein said other of said members is provided with a spring-loaded detent received in an axially extending bore of said end face between two of said retaining lugs and in confronting relationship with a marginal zone of said second disk, said marginal zone being formed with a depression receiving said detent in said locking position for preventing a detachment of said second disk.

2. A journal bearing as defined in claim 1 wherein said marginal zone overlies only part of a confronting end of said detent for facilitating manual depression of the latter against the associated spring force to release said second disk from said locking position.

3. A journal bearing as defined in claim 2 wherein said detent is a cylindrical pin and said depression is a part-circular notch.

4. A journal bearing as defined in claim 1 wherein said first disk is provided with a resilient marginal strip approaching said second disk.

5. A journal bearing as defined in claim 1 wherein said rotary bodies are cylindrical rollers disposed in a plurality of parallel rows, said rows being separated by spacing means rigid with said one of said members.

6. A journal bearing as defined in claim 1, 2, 3, 4 or 5 wherein said other of said members is said outer member.

* * * * *